(12) United States Patent
Forutanpour et al.

(10) Patent No.: US 9,092,664 B2
(45) Date of Patent: Jul. 28, 2015

(54) USE OF EMG FOR SUBTLE GESTURE RECOGNITION ON SURFACES

(71) Applicant: QUALCOMM Incorporated, San Diego, CA (US)

(72) Inventors: Babak Forutanpour, Carlsbad, CA (US); Shivakumar Balasubramanyam, San Diego, CA (US); Vitor R. Carvalho, San Diego, CA (US); Bennett M. King, San Diego, CA (US); Jill S. Iwasaki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 13/740,315

(22) Filed: Jan. 14, 2013

(65) Prior Publication Data
US 2014/0198944 A1    Jul. 17, 2014

(51) Int. Cl.
*G06K 9/00* (2006.01)
*G06F 3/01* (2006.01)
*H04N 5/225* (2006.01)

(52) U.S. Cl.
CPC ............ *G06K 9/00335* (2013.01); *G06F 3/011* (2013.01); *G06F 3/015* (2013.01); *G06F 3/017* (2013.01)

(58) Field of Classification Search
CPC ..................................... G06K 9/00; G06F 3/00

USPC .................. 382/103, 107, 236; 345/173, 175; 348/154, 155, 169, 170, 171, 172, 352
See application file for complete search history.

(56) References Cited

U.S. PATENT DOCUMENTS

| | | | | |
|---|---|---|---|---|
| 7,333,090 | B2* | 2/2008 | Tanaka et al. ................. | 345/158 |
| 7,519,223 | B2* | 4/2009 | Dehlin et al. ................. | 382/203 |
| 8,170,656 | B2* | 5/2012 | Tan et al. ...................... | 600/546 |
| 2009/0278798 | A1 | 11/2009 | Kim et al. | |
| 2010/0219989 | A1 | 9/2010 | Asami et al. | |
| 2010/0302137 | A1 | 12/2010 | Benko et al. | |
| 2011/0210931 | A1 | 9/2011 | Shai | |
| 2011/0221672 | A1 | 9/2011 | Osterhout et al. | |

FOREIGN PATENT DOCUMENTS

WO    2011151881 A1    12/2011

OTHER PUBLICATIONS

International Search Report and Written Opinion—PCT/US2014/011136—ISAEPO—Apr. 4, 2014.

* cited by examiner

*Primary Examiner* — Abolfazl Tabatabai
(74) *Attorney, Agent, or Firm* — Linda G. Gunderson

(57) ABSTRACT

An apparatus, a method, and a computer program product for detecting a gesture of a body part relative to a surface are provided. The apparatus determines if the body part is in proximity of the surface. If the body part is in proximity of the surface, the apparatus determines if electrical activity sensed from the body part is indicative of contact between the body part and the surface. If the body part is in contact with the surface, the apparatus determines if motion activity sensed from the body part is indicative of the gesture.

29 Claims, 6 Drawing Sheets

USE OF EMG FOR SUBTLE GESTURE RECOGNITION ON SURFACES

BACKGROUND

1. Field

The present disclosure relates generally to gesture recognition, and more particularly to the use of electromyography (EMG) for subtle gesture recognition on surfaces.

2. Background

Systems and applications for implementing augmented reality (AR) have become very popular and widespread. AR systems typically include a head mounted display (HMD) that allow users to simultaneously see and interact with their surroundings while interacting with applications, such as e-mail and media players. Although many AR applications may be run on smartphones and tablets, the most natural form factor for implementing AR systems are optical devices, such as glasses.

Conventional methods for interacting with an application through AR glasses include hand gestures, whereby different broad motions of a wearer's hands within the field of vision of the AR glasses initiate different operations of the glasses. However, such methods suffer from significant drawbacks. For example, a wearer may not want to call attention to herself by performing such broad gestures in public. Accordingly, it is desirable to have different set of gestures for private, semi-private and public situations.

SUMMARY

An apparatus, a method, and a computer program product for detecting a gesture of a body part relative to a surface are provided. The apparatus determines if the body part is in proximity of the surface. If the body part is in proximity of the surface, the apparatus determines if electrical activity sensed from the body part is indicative of contact between the body part and the surface. If the body part is in contact with the surface, the apparatus determines if motion activity sensed from the body part is indicative of the gesture.

DETAILED DESCRIPTION

Figure 1:
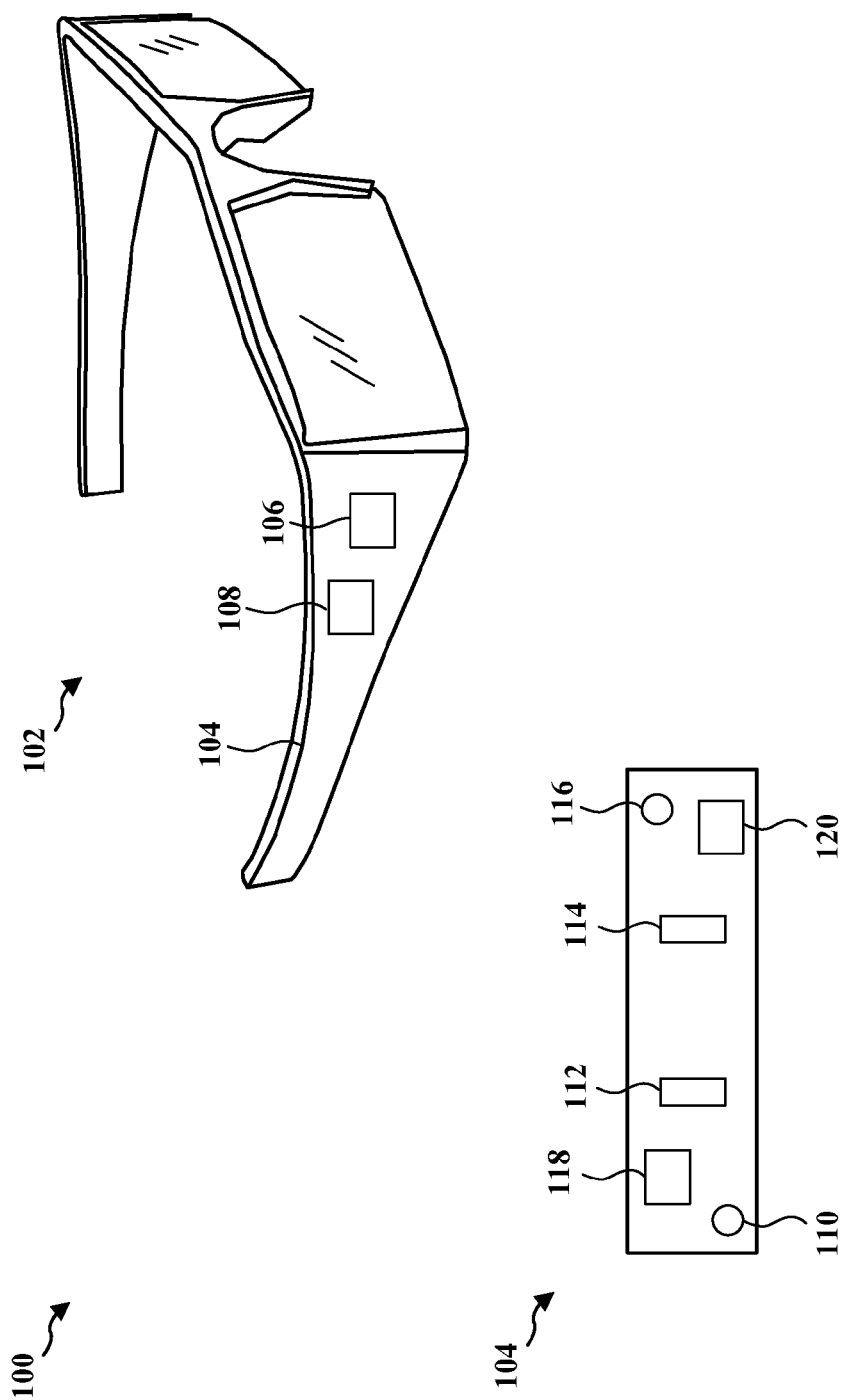
FIG. 1 is a diagram illustrating an exemplary gesture system including a user device and a gesture recognition device.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of a gesture recognition system will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating a gesture recognition system 100 that includes a user device 102 and a gesture recognition device 104. The user device 102 illustrated is a pair of AR glasses configured to project content through its lenses using methods known in the art. For example, the AR glasses 102 may be configured to project application content through its lenses, such as e-mails, documents, web pages, or media content such as video games, movies or electronic books. Other types of user devices 102 may include Smartphones, tablets, laptops, etc.

The AR glasses 102 include a communications device 116 for communicating with the gesture recognition device 104.

The communications device 106 may be, for example, a Bluetooth device. The AR glasses 102 further include a processor 108 for processing signals received from the gesture recognition device 104.

The gesture recognition device 104 is configured to be associated with a body part and may be any form conducive to provide such association. For example, if the body part is a hand or finger, the gesture recognition device may be configured as a wristband 104, as illustrated in FIG. 1. In one configuration, the gesture recognition device 104 includes a proximity sensor 110, a pair of electrodes 112, 114 that provide EMG sensing capability, a motion sensor 116 and a communication device 118 for communicating with the user device 102. The gesture recognition device 104 also includes a processor 120 for processing signals provided by the various sensors. The sensors 110, 112, 114, 116 in combination with the processor provide detection capabilities as explained further below.

In the case of a gesture recognition device 104 in the form of a wristband, the proximity sensor 110 is preferably positioned on the wristband such that when the user is wearing the wristband the proximity sensor is located at the bottom, or underside, of the wrist. The proximity sensor 110 is a low power device that is periodically poled, for example once every second, by the processor 120 to provide signals indicative of the closeness between the proximity sensor and a structure. The proximity sensor 110 may be a range finding device based on well known infrared detection or ultra sound detection technology. Alternatively, or in addition, the proximity sensor 110 may be a touch sensing device based on well known capacitive technology.

The electrodes 112, 114 are preferably positioned on the wristband such that when the user is wearing the wristband 104 the electrodes are located so as to sense electrical activity resulting from muscular movement of the wrist. The electrodes 112, 114 in combination with a EMG sensing element of the processor 120, function as an EMG sensor that provides signals indicative of potential contact between the body part and a surface. The EMG sensing capability is based on well known technology.

The motion sensor 116 may be positioned anywhere on the wristband and provides signals indicative of movement of the body part. The indications provided may be one of general overall movement of the body part or finer movement of the body part corresponding to a gesture. The motion sensor may be, for example, an accelerometer, gyroscope, or magnetometer.

Figure 2:
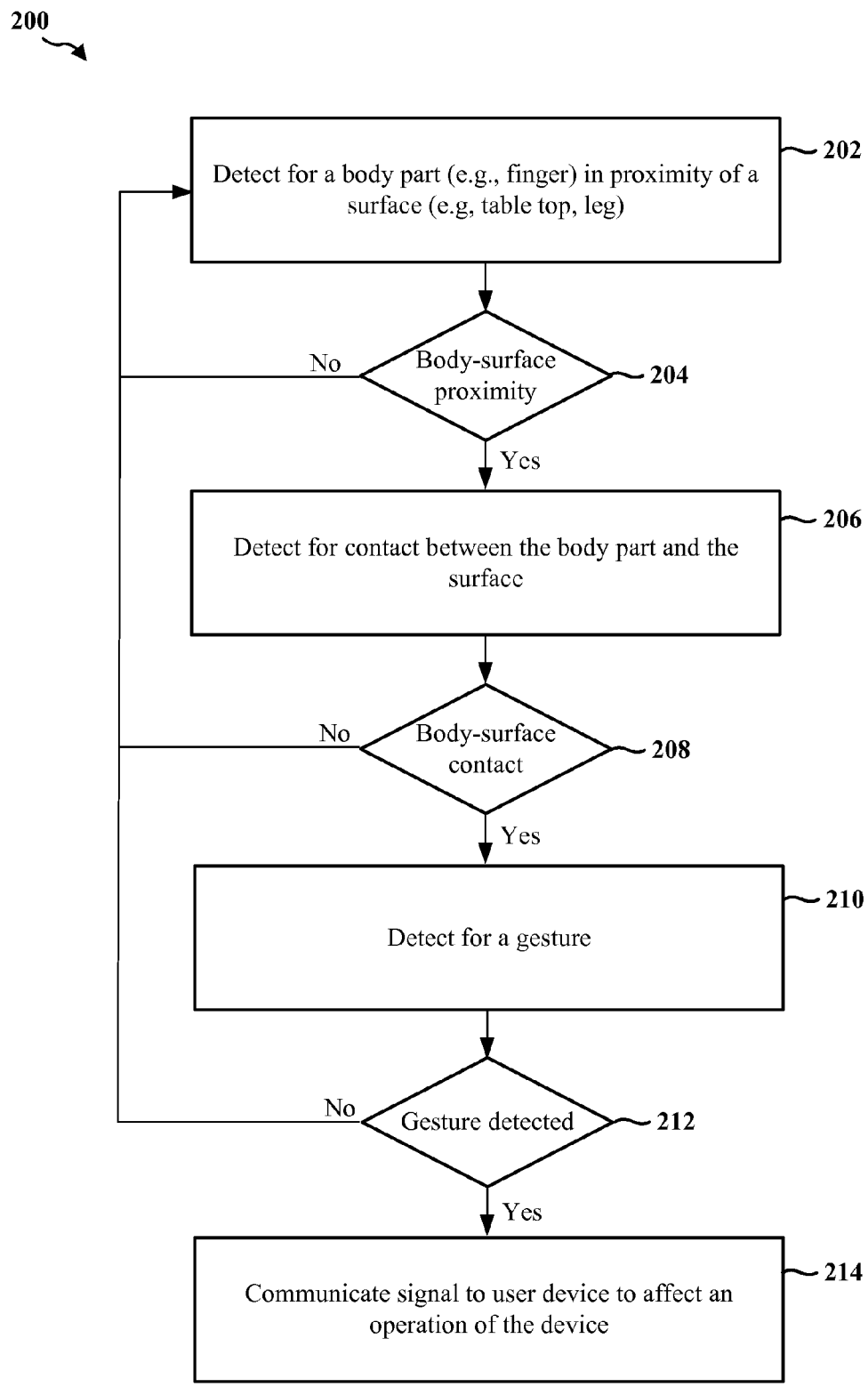
FIG. 2 is a flow chart of a method of recognizing a gesture and affecting an operation of a user device based on the gesture.

FIG. 2 is a flow chart of a method of detecting a gesture of a body part. The process is directed toward detecting gestures on a generally flat surface while avoiding gesture detection due to body movement through the air. To that end, at step 202 a gesture recognition device detects if a body part is in proximity of a generally flat surface. The body part may be, for example, a finger. The generally flat surface may be, for example, a table top or a top of a user's leg.

Proximity detection serves as a trigger event for further processing steps and eliminates false gesture detection due to body part movement through the air. Proximity detection may be done using a type of proximity sensor described above. In one configuration, the processor 120 of the gesture recognition device 104 periodically poles the proximity sensor 110 to obtain a signal, for example, once every second. The processor 120 processes the obtained signal to determine if the proximity sensor 110 is within a threshold distance of the surface. For example, the processor 120 may be programmed with a proximity threshold, e.g., 5 centimeters. If the signal provided by the proximity sensor 110 corresponds to a distance at or below the threshold then the processor 120 concludes that the body part is in proximity of the surface. In other words, the gesture recognition device 104 detects proximity between the body part and the surface. As mentioned above, this proximity detection eliminates false gesture detections that may result from hand movement through the air.

At step 204, if the body part is determined not to be in proximity of a flat surface, the process returns to step 202. If, however, the body part is determined to be in proximity of a flat surface, the process proceeds to step 206, where the gesture recognition device 104 detects for muscular electrical activity indicative of contact between the body party and the surface. This may be done using the EMG sensor described above. In one configuration, in order to conserve system power, the EMG sensor (e.g., the electrodes 112, 114 and the EMG sensing element of the processor 120) is maintained in a sleep mode until the body part is determined to be in proximity of a surface. Once body-surface proximity is detected and the EMG sensor is awaken, other elements of the processor 120 receives signal from the EMG sensor and compare the signals to a criterion of electrical activity corresponding to placement of the body part on a surface. If the criterion is satisfied, the processor 120 concludes the body part is placed on the surface. In other words, the gesture recognition device 104 detects body-surface contact.

Figure 3:
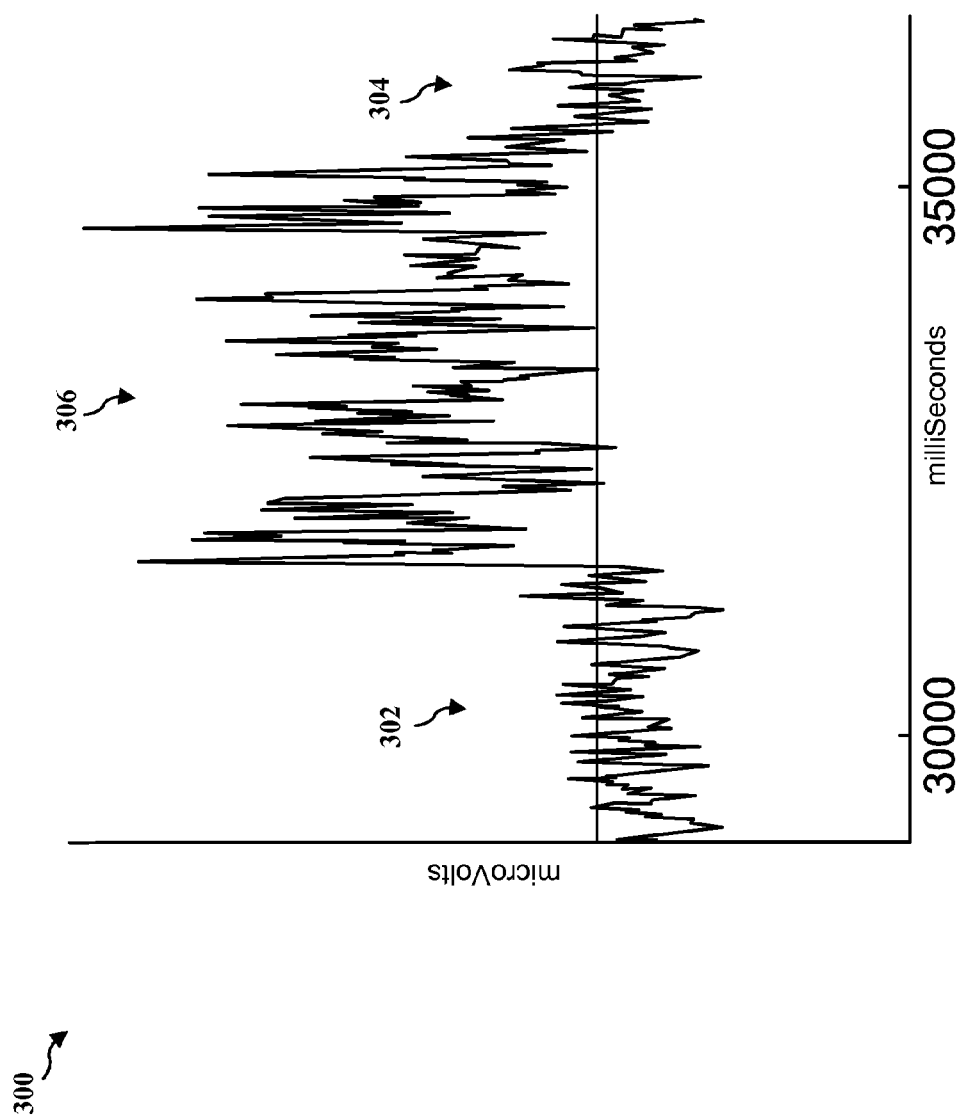
FIG. 3 is a graph illustrating changes in an output of an EMG sensor corresponding to a body part both in contact and out of contact with a surface.

FIG. 3 is a graph 300 illustrating EMG signal amplitude as a function of time. Low-level portions 302, 304 represent muscular activity corresponding to a lack of contact between the body part and the surface. Higher-level portion 306 represents a higher level muscular activity corresponding to contact between the body part and the surface. Based on experimental EMG signal data, criterions indicative of contact between a body part and a surface may be established. For example, the peak-to-peak voltage, or the dynamic range of experimental EMG signals measured during contact may serve as a criterion against which measurements of later obtained EMG signals may be compared. The processor 120 compares measurements of the obtained signal to a threshold defined by the experimental data. If the threshold is satisfied, the processor 120 concludes there is contact between the body part and the surface. In other words, the gesture recognition device 104 detects body-surface contact. Otherwise the processor 120 concludes there is no contact. Optionally, a time criterion may also be implemented, wherein the measurement of the obtained signal has to satisfy the threshold for a certain amount of time before body-surface contact is considered detected.

At step 208, if the body part is determined not to be in contact with a flat surface, the process returns to step 202. Alternatively, the process may return to step 206. If, however, the body part is determined to be in contact with a flat surface, the process proceeds to step 210, where the gesture recognition device detects for motion activity of the body part indicative of a gesture. This may be done using a motion sensor 116 as described above. In one configuration, in order to conserve system power, the motion sensor 116 is maintained in a sleep mode until the body part is determined to be in contact with the surface. Once body-surface contact is detected and the motion sensor 116 is awaken, the processor 120 receives signals from the motion sensor and compares the signals to a criterion of motion activity corresponding to the gesture. If the criterion is satisfied, the processor 120 concludes the body part made the gesture. In other words, the gesture recognition device 104 detects a gesture.

Figure 4:
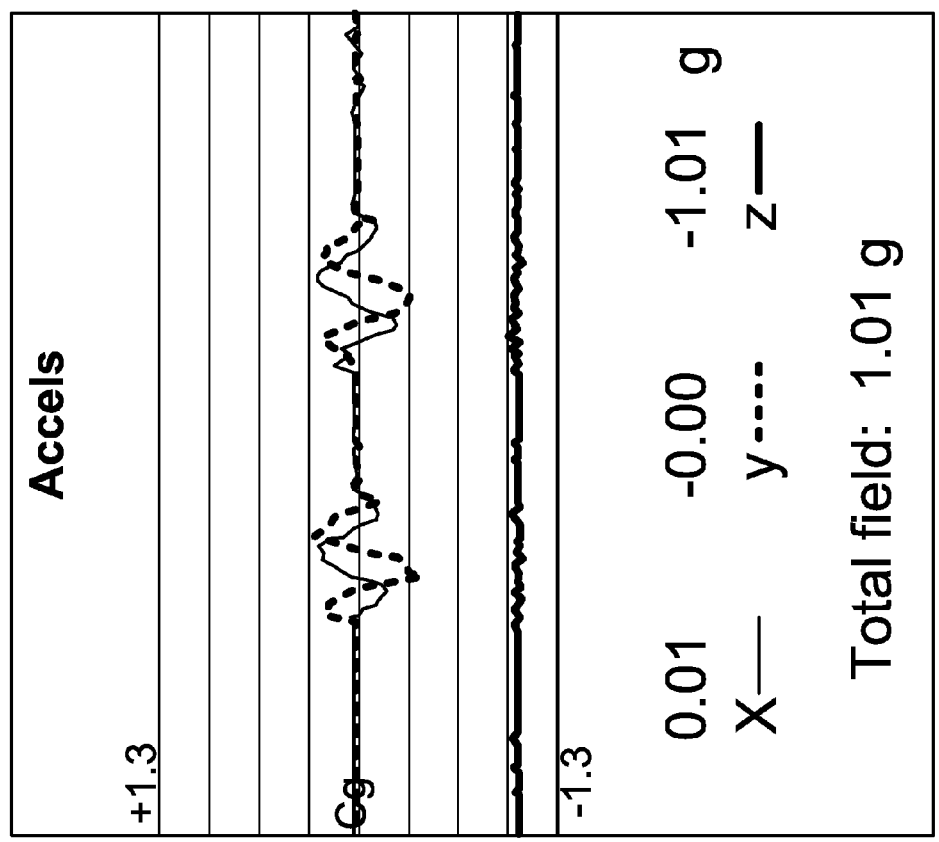
FIG. 4 is a graph illustrating changes in accelerometer output corresponding to a gesture of a body part.

FIG. 4 is a graph 500 illustrating motion sensor, e.g., accelerometer, signals as a function of time, wherein the signals correspond to a user making a letter "O" gesture on a flat surface, twice. It is noted that the movement takes place in the x and y planes, while little if any movement occurs in the z plane. This is merely one of many motion signal forms or motion-gesture templates that may be obtained experimentally. The processor 120 includes a library of these gesture templates. The processor 120 compares obtained motion sensor signals against the library of motion-gesture templates. If the form of the obtained motion signal closely matches one of the motion-gesture templates, the processor 120 concludes that the body part made the gesture associated with the matched motion-gesture template. In other words, the gesture recognition device 104 detects a gesture. The level of closeness between the obtained motion signals and the motion-gesture templates defines the criterion described above. For example, point-by-point voltage comparisons, or waveform area comparison of an obtained motion signal and a motion-gesture template may yield a percentage match between the waveform. In this case, the criterion may be percentage, e.g., 90%, and a yielded percentage at or above the criterion may be considered to result in gesture detection.

At step 212, if a gesture is not detected, the process returns to step 202. Alternatively, the process may return either of step 206 or step 210. If, however, a gesture is detected, then at step 214 a signal is communicated to the user device 102. The signal is for affecting an operation of the device 102 corresponding to the detected gesture. In one configuration, the processor 120 of the gesture recognition device 104 includes a look-up table of gestures and corresponding output signals to transmit to the user device 102 to affect its operation. For example, if the detected gesture is a letter "O," the recognition device 104 may output a signal to the user device that causes the user device to open an application. As another example, clockwise movement of the finger on a surface results in the recognition device 104 outputting a signal that causes the user device to scroll down an open document. In another configuration, the look-up table may reside with the user device, in which case the recognition device 104 simply communicates a signal corresponding to the gesture itself and the user device 102 determines the operation to be affected through its look-up table. As mentioned above, communication between the gesture recognition device 104 and the user device 102 may be wireless.

As an additional optional step (not shown), prior to determining if the sensed electrical activity is in indicative of contact between the body part and a surface (step 206), the gesture recognition device 104 may first determine if the body part is exhibiting any type of motion. This may be done using a motion sensor 116 as described above. The processor 120 receives signals from the motion sensor 116 and compares the signals to a criterion of general motion activity. If the criterion is satisfied, the processor 120 concludes the body part is moving and the process proceeds to step 206. In other words, the gesture recognition device 104 detects general motion by the body part. The criterion in this regard may simply relate to particular level of movement in any direction without having to match a motion-gesture template.

This initial general motion sensing is beneficial in that it may eliminate computationally intensive EMG sensor processing and motion-gesture template match processing in cases where they are not warranted. For example, if the user's hand is resting on a surface, without any movement, the gesture recognition device 104 would detect body-surface proximity. Next step EMG sensing by the gesture recognition device 104 would detect body-surface contact. Subsequent step motion-template matching, however, would result in no motion-template match, as the hand is resting. Detecting for general motion of the body part, prior to detecting for body-surface contact and motion-template match, would rule out a need for these processing steps.

Figure 5:
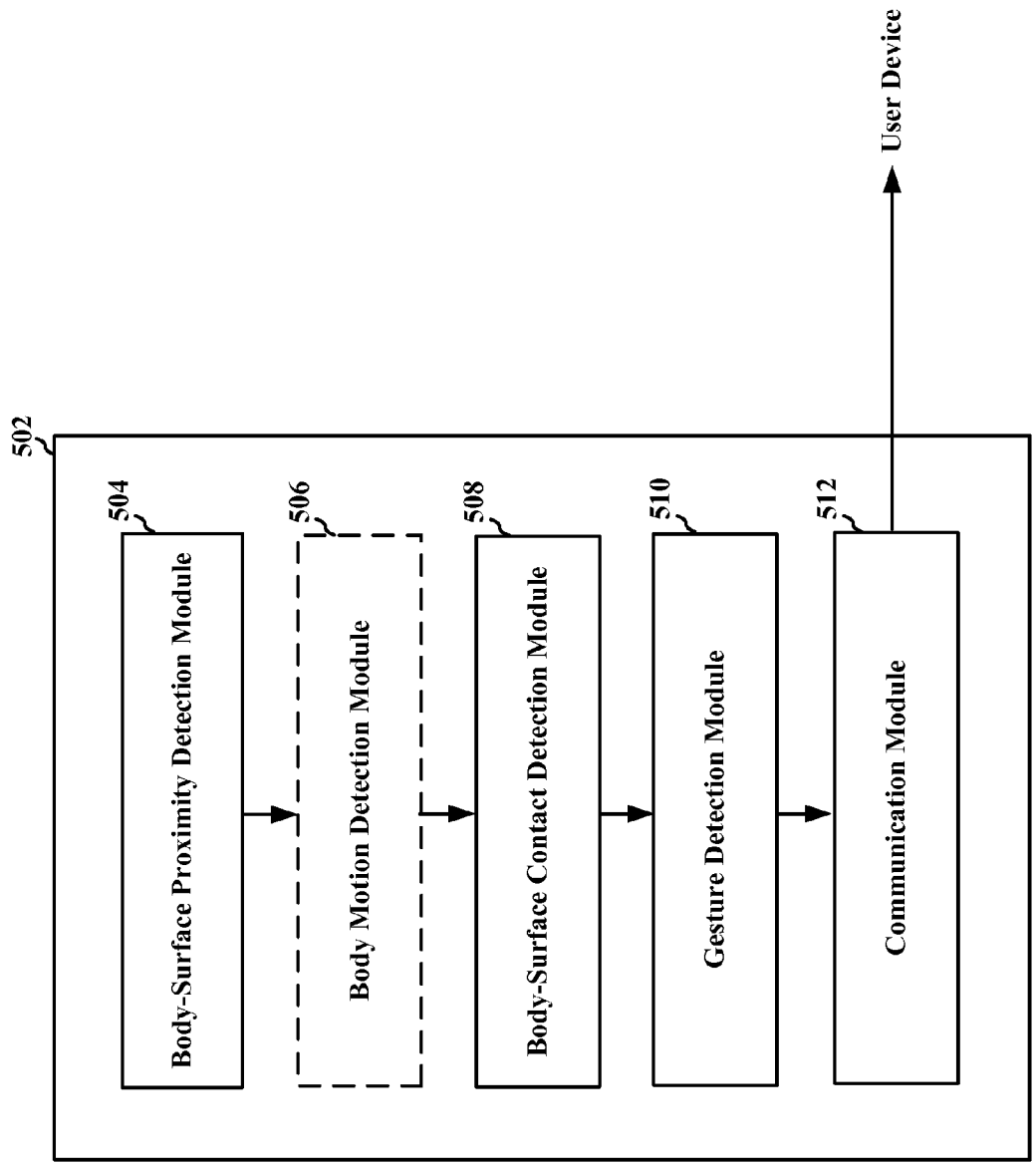
FIG. 5 is a conceptual flow diagram illustrating the operation of different modules/means/components in an exemplary gesture recognition apparatus.

FIG. 5 is a conceptual flow diagram 500 illustrating the operation of different modules/means/components in an exemplary gesture detection apparatus 502. The apparatus 502 includes a body-surface proximity detection module 504, an optional body motion detection module, a body-surface contact detection module 506, gesture detection module 508, and a communications module 510. The body-surface proximity detection module 504 determines if a body part is in proximity of a surface. The body motion detection module 506 determines if the body part is in motion. The body-surface contact detection module 508 determines if electrical activity sensed from the body part is indicative of contact between the body part and the surface. The gesture detection module 510 determines if motion activity sensed from the body part is indicative of the gesture. The communications module 510 communicates signals to a user device that affect an operation of the user device.

The apparatus may include additional modules that perform each of the steps of the algorithm in the aforementioned flow chart of FIG. 2. As such, each step in the aforementioned flow chart of FIG. 2 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 6:
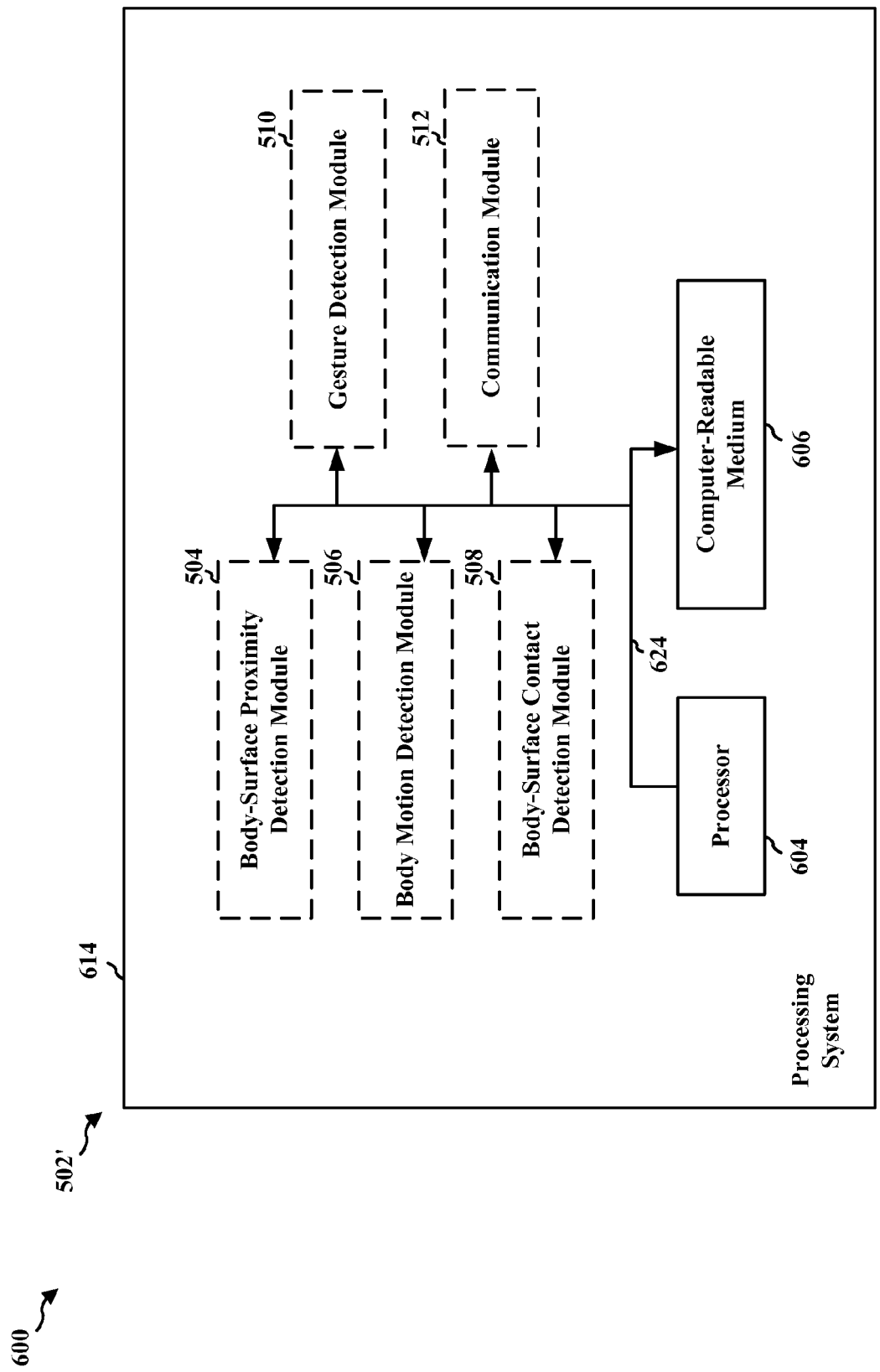
FIG. 6 is a diagram illustrating an example of a hardware implementation for a gesture recognition apparatus employing a processing system.

FIG. 6 is a diagram illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware modules, represented by the processor 604, the modules 504, 506, 508, 510, 512 and the computer-readable medium 606. The bus 624 may also link various other circuits such as timing sources, peripherals, voltage regulators, and power management circuits, which are well known in the art, and therefore, will not be described any further.

The processing system 614 includes a processor 604 coupled to a computer-readable medium 606. The processor 604 is responsible for general processing, including the execution of software stored on the computer-readable medium 606. The software, when executed by the processor 604, causes the processing system 614 to perform the various functions described supra for any particular apparatus. The computer-readable medium 606 may also be used for storing data that is manipulated by the processor 604 when executing software. The processing system further includes at least one of the modules 504, 506, 508, 510, 512. The modules may be software modules running in the processor 604, resident/stored in the computer readable medium 606, one or more hardware modules coupled to the processor 604, or some combination thereof.

In one configuration, the apparatus 502/502' includes means for determining if the body part is in proximity of the surface, means for determining if electrical activity sensed from the body part is indicative of contact between the body part and the surface, if the body part is in proximity of the surface, and means for determining if motion activity sensed from the body part is indicative of the gesture, if the body part is in contact with the surface. The apparatus 502/502' may further include means for determining if the body part is in motion, prior to determining if the sensed electrical activity is in indicative of contact between the body part and a surface, and means for communicating a signal to a user device in response to detecting the gesture, the signal for affecting an operation of the user device. The aforementioned means may be one or more of the aforementioned modules of the apparatus 502 and/or the processing system 614 of the apparatus 502' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of detecting a gesture of a body part relative to a surface, said method comprising:
   determining if the body part is in proximity of the surface;
   if the body part is in proximity of the surface, determining if muscular electrical activity sensed from the body part is indicative of contact between the body part and the surface using output of an electromyography (EMG) sensor; and
   if the body part is in contact with the surface, determining if motion activity sensed from the body part is indicative of the gesture,
   wherein determining if the body part is in proximity of the surface comprises:
      monitoring signals from a proximity sensor associated with the body part; and
   wherein if the body part is in proximity of the surface, determining if muscular electrical activity sensed from the body part is indicative of contact between the body part and the surface comprises:
      in response to one or more signals from the proximity sensor, changing a state of the EMG sensor from a lower power state to a higher power state; and
      monitoring output from the EMG sensor to determine contact between the body part and the surface.

2. The method of claim 1, wherein determining if sensed electrical activity is indicative of contact between the body part and the surface comprises:
   comparing the electrical activity sensed from the body part to a criterion of electrical activity corresponding to a placement of the body part on a surface; and
   concluding the body part is in contact with the surface when the criterion is satisfied.

3. The method of claim 2, wherein said criterion comprises a plurality of criteria.

4. The method of claim 1, wherein determining if sensed motion activity is indicative of the gesture comprises:
   comparing the motion activity sensed from the body part to a criterion of motion activity corresponding to the gesture; and
   concluding the body part made the gesture when the criterion is satisfied.

5. The method of claim 1, further comprising:
   prior to determining if the sensed electrical activity is in indicative of contact between the body part and a surface, determining if the body part is in motion.

6. The method of claim 5, wherein determining if the body part is in motion comprises:
   comparing motion activity sensed from the body part to a criterion of motion activity corresponding to motion; and
   concluding the body part is in motion when the criterion is satisfied.

7. The method of claim 1, further comprising, in response to detecting the gesture, transmitting a signal including information associated with the gesture to the user device.

8. The method of claim 1, wherein if the body part is in contact with the surface, determining if motion activity sensed from the body part is indicative of the gesture comprises:
   in response to one or more signals from the EMG sensor changing a state of a motion sensor from a lower power state to a higher power state; and
   monitoring motion activity from a motion sensor associated with the body part to determine motion of the body part indicative of a gesture.

9. An apparatus for detecting a gesture of a body part relative to a surface, said apparatus comprising:
   means for determining if the body part is in proximity of the surface, wherein the means for determining if the body part is in proximity of the surface comprises means for monitoring signals from a proximity sensor associated with the body part;
   means for determining if electrical activity sensed from the body part is indicative of contact between the body part and the surface, if the body part is in proximity of the surface, the means for determining comprising means for changing a state of an EMG sensor from a lower power state to a higher power state in response to one or more signals from the proximity sensor and means for monitoring output from the EMG sensor to determine contact between the body part and the surface, and
   means for determining if motion activity sensed from the body part is indicative of the gesture, if the body part is in contact with the surface.

10. The apparatus of claim 9, wherein the means for determining if sensed electrical activity is indicative of contact between the body part and the surface comprises means for:
   comparing the electrical activity sensed from the body part to a criterion of electrical activity corresponding to a placement of the body part on a surface; and concluding the body part is in contact with the surface in response to determining the criterion is satisfied.

11. The apparatus of claim 9, wherein the means for determining if sensed motion activity is indicative of the gesture comprises means for:
   comparing the motion activity sensed from the body part to a criterion of motion activity corresponding to the gesture; and
   concluding the body part made the gesture in response to determining the criterion is satisfied.

12. The apparatus of claim 11, further comprising a library of gesture criteria, the library of gesture criteria including criteria corresponding to a plurality of gestures.

13. The apparatus of claim 9, further comprising means for determining if the body part is in motion, prior to determining if the sensed electrical activity is in indicative of contact between the body part and a surface.

14. The apparatus of claim 13, wherein the means for determining if the body part is in motion comprises means for:
   comparing motion activity sensed from the body part to a criterion of motion activity corresponding to motion; and
   concluding the body part is in motion in response to determining the criterion is satisfied.

15. The apparatus of claim 9, further comprising means for communicating a signal to a user device in response to detecting the gesture.

16. An apparatus for detecting a gesture of a body part relative to a surface, said apparatus comprising:
   memory; and
   a processing system configured to access the memory and execute instructions to:
      determine if the body part is in proximity of the surface by monitoring signals from a proximity sensor associated with the body part;
      determine if electrical activity sensed from the body part is indicative of contact between the body part and the surface, if the body part is in proximity of the surface, using output of an electromyography (EMG) sensor, the processing system configured to determine if electrical activity sensed from the body part is indicative of contact between the body part and the surface by initiating change of a state of the EMG sensor from a lower power state to a higher power state in response to one or more signals from the proximity sensor and by monitoring output from the EMG sensor to determine contact between the body part and the surface; and
      determine if motion activity sensed from the body part is indicative of the gesture, if the body part is in contact with the surface.

17. The apparatus of claim 16, further comprising the EMG sensor, and wherein the processing system is configured to determine if sensed electrical activity is indicative of contact between the body part and the surface by:
   comparing the electrical activity sensed from the body part to a criterion of electrical activity corresponding to a placement of the body part on a surface; and
   concluding the body part is in contact with the surface when the criterion is satisfied.

18. The apparatus of claim 16, wherein the processing system is configured to determine if sensed motion activity is indicative of the gesture by:
   comparing the motion activity sensed from the body part to a criterion of motion activity corresponding to the gesture; and
   concluding the body part made the gesture when the criterion is satisfied.

19. The apparatus of claim 18 further comprising a library of gesture criteria, each criterion corresponding to a different gesture.

20. The apparatus of claim 16, wherein the processing system is configured to determine if the body part is in motion, prior to determining if the sensed electrical activity is indicative of contact between the body part and a surface.

21. The apparatus of claim 20, wherein the processing system is configured to determine if the body part is in motion by:
   comparing motion activity sensed from the body part to a criterion of motion activity corresponding to motion; and
   concluding the body part is in motion in response to satisfaction of the criterion.

22. The apparatus of claim 16, wherein the processing system is configured communicate a signal to a user device in response to detecting the gesture.

23. A computer program product for detecting a gesture of a body part relative to a surface, said product comprising:
   a non-transitory computer-readable medium comprising code for:
      determining if the body part is in proximity of the surface by monitoring signals from a proximity sensor associated with the body part;
      if the body part is in proximity of the surface, determining if electrical activity sensed from the body part is indicative of contact between the body part and the surface using information indicative of an output of an electromyography (EMG) sensor, wherein determining if electrical activity sensed from the body part is indicative of contact between the body part and the surface comprises initiating change of a state of the EMG sensor from a lower power state to a higher power state in response to one or more signals from the proximity sensor and monitoring output from the EMG sensor to determine contact between the body part and the surface; and
      if the body part is in contact with the surface, determining if motion activity sensed from the body part is indicative of the gesture.

24. The product of claim 23, wherein code for determining if sensed electrical activity is indicative of contact between the body part and the surface comprises code for:
   comparing the electrical activity sensed from the body part to a criterion of electrical activity corresponding to a placement of the body part on a surface; and
   concluding the body part is in contact with the surface when the criterion is satisfied.

25. The product of claim 23, wherein code for determining if sensed motion activity is indicative of the gesture code for comprises:
   comparing the motion activity sensed from the body part to a criterion of motion activity corresponding to the gesture; and
   concluding the body part made the gesture when the criterion is satisfied.

26. The product of claim 25 further comprising code defining a library of gesture criteria, each criterion corresponding to a different gesture.

27. The product of claim 23, further comprising code for determining if the body part is in motion, prior to determining if the sensed electrical activity is in indicative of contact between the body part and a surface.

28. The product of claim 27, wherein code for determining if the body part is in motion comprises code for:
  comparing motion activity sensed from the body part to a criterion of motion activity corresponding to motion; and
  concluding the body part is in motion when the criterion is satisfied.

29. The product of claim 23, further comprising code for communicating a signal to a user device in response to detecting the gesture, the signal for affecting an operation of the user device.

* * * * *